ROBERT SCORER'S
IMPROVEMENT IN COOKING-STOVES
REISSUED JAN 18 1870
3801
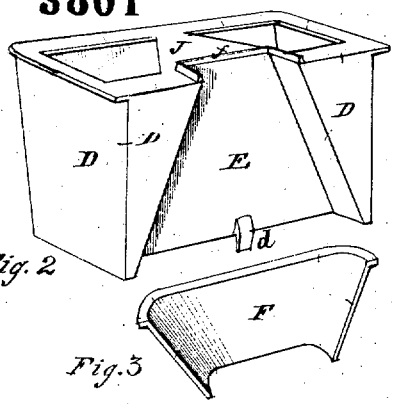
Fig. 2
Fig. 3
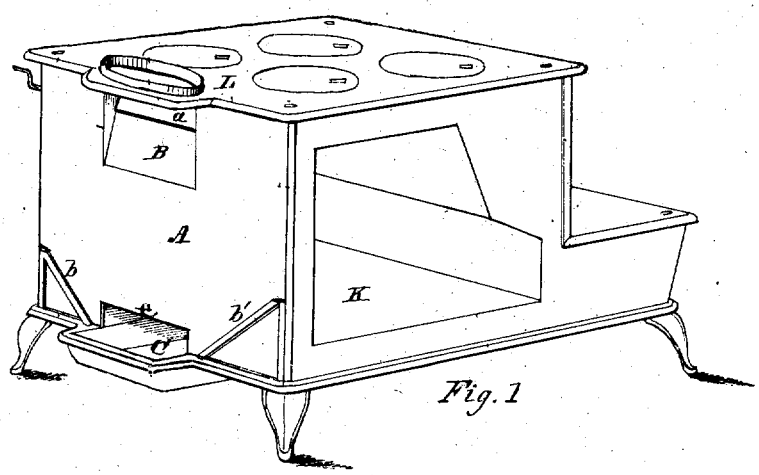
Fig. 1
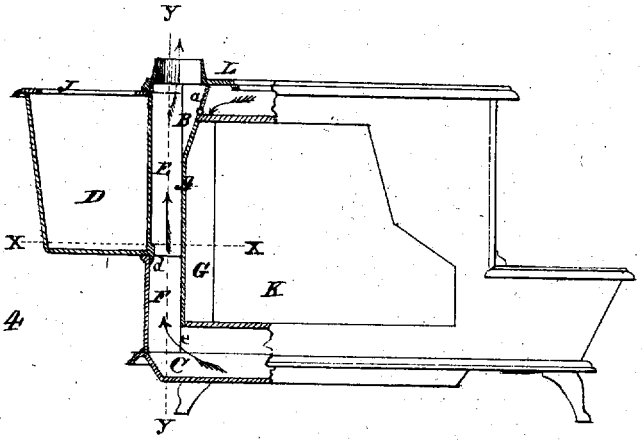
Fig. 4
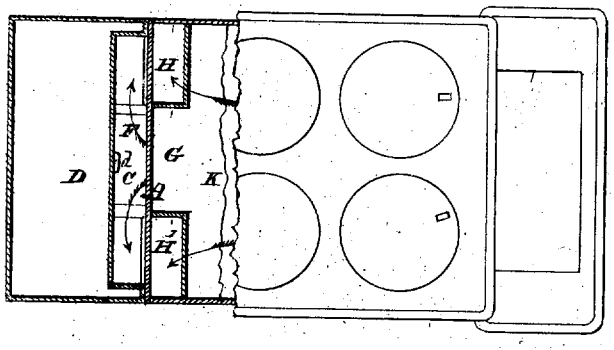
Fig. 5
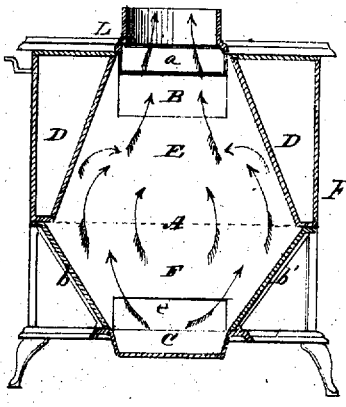
Fig. 6
WITNESSES-
Robt Hann
C Savage
INVENTOR
Robt Scorer

United States Patent Office.

ROBERT SCORER, OF TROY, NEW YORK.

*Letters Patent No.* 94,845, *dated September* 14, 1869; *reissue No.* 3,801, *dated January* 18, 1870.

COOKING-STOVE.

The Schedule referred to in these Letters Patent and making part of the same

*To all whom it may concern:*

Be it known that I, ROBERT SCORER, of Troy, in the county of Rensselaer, and State of New York, have invented certain new and useful Improvements in Cooking-Stoves, of which the following is a full and exact specification, reference being had to the accompanying drawings, and letters of reference marked thereon, making a part thereof, in which—

Figure 1 is a perspective view of the rear end of the stove;

Figure 2 is a perspective view of the water-reservoir's side, which adjoins the rear end of the stove;

Figure 3 is a perspective view of the lower part or plate of the rising-flue;

Figure 4 is a vertical longitudinal sectional elevation of the stove with the water-reservoir attached thereto;

Figure 5 is a horizontal sectional view through the water-reservoir and rear-end flues of the stove, taken at the dotted line *x x* of fig. 4; and Figure 6 is a vertical section, taken at the dotted line *y y* of fig. 4.

The same letters refer to like parts in each of the said figures.

The object of my said invention is to make such a construction and arrangement of the vertical or rising exit-flue, for the gases of combustion of a three-flued cooking-stove, as to better equalize and retain heat in and about the oven thereof, and thus improve its baking-qualities; and also so that a hot-water reservoir or tank may be used in combination therewith, without lessening in any degree, by such use, the ability of said oven to bake quickly and uniformly.

The nature of my said invention consists in locating and arranging the rising or ascending exit-flue for the gases of combustion of a three-flued cooking-stove, in the rear of the diving-flues thereof, and so as to substantially cover or overlap the same.

It also consists in extending the oven of the stove between the diving-flues thereof.

It also consists in separating the diving-flues from the rising exit-flue of a three-flued cooking-stove, by means of a division-plate, arranged transversely, and extending from side to side thereof.

It also consists in constructing the rising exit-flue aforesaid in an expanded and contracted form.

It also consists in constructing the contracted or upper part of the aforesaid rising-flue, by recessing it in the side of a water-tank or reservoir, all substantially as hereinafter fully described and shown.

By my invention, the hot gases of combustion, passing into the rising exit-flue aforesaid, are concentrated and reverberated, or spread therein, so as to cover the greater part of the rear side of the diving-flues aforesaid, before finally passing out, which thus equalizes and better maintains a good baking-heat in and about the oven; and also it causes a more effectual heating of a water-reservoir or tank, as combined therewith.

I now proceed to fully show and describe the construction of my invention.

The accompanying drawings represent a three-flued cooking-stove or range, of the ordinary form of construction, except its rear end or vertical flues, the parts embodying my invention, which are constructed and arranged substantially as follows:

The back or flue-division plate A of the stove has a notched opening, *e*, in its bottom edge, and of the size of the central bottom flue C, about as shown. On each side of said opening *e* there are arranged, on said plate A, and slanting toward said opening *e*, the dovetail sided flanges *b* and *b'*. The top central part of said plate is recessed at B, so as to make a clear passage to the exit-pipe placed thereover, all substantially as shown in the drawings.

The descending or diving-flues H and H' are formed and located in manner as shown in fig. 5 of the drawings, and so as to form a recess or extension, G, of the oven between said flues.

The lower part or plate F of the ascending or rising-flue is made in a separate piece, consisting of a back and end sides, and in an expanded or flaring shape, from its bottom to its top part, substantially as shown in fig. 3 of the drawings; and its end edges, where adjoining the back or division-plate A of the stove, are so made as to catch or hook on to the flanges *b* and *b'*, aforesaid, or so as to be bolted or otherwise secured in its proper position, as shown in figs. 4 and 6 of the drawings.

The water-reservoir or tank D D has made in its front side, adjoining the rear end or division-plate A of the stove, a recessed flue, E, which, at the bottom part of the reservoir, is nearly the whole width thereof, while its upper part or top is contracted in size, so as to come under the pipe-opening or collar of the stove, substantially as shown. At the bottom edges of this recessed flue, there is made a hook or flange, *d*, and at the top part of said flue there is also made a flange, *f*. The reservoir is provided with a cover and lids.

These aforesaid rising-flue parts are combined and attached to the stove in manner substantially as follows:

The flue-plate F is hooked, by its end edges, to the flanges *b* and *b'* on the division-plate A, or else bolted to said plate, its bottom edge resting over and covering the central flue-opening C. The water-reservoir D D is then placed thereon, with its hook or flanges *d* on the inside of the plate F, and its flue-side next the flue-division plate A. The top plate L, which has its under side, about the exit-pipe opening, made to fit snugly over the flange *f* of the reservoir, is then placed thereover, and secured, which thus holds the water-reservoir D D and flue-plate F securely in their proper positions for use, as shown in the annexed drawings.

When the direct-draught damper *a* is closed, the hot gases of combustion pass down the diving-flues H and H′, under the oven, and into the central flue C, thence into the expanded and contracted rising-flue F E, where they are retarded, in passing, and spread out or reverberated in said flue, in manner about as shown by the arrows in fig. 6, thus maintaining a better baking-heat in and about the oven, and more effectually heating water in the reservoir or tank of the stove.

When the aforesaid expanded and contracted rising-flue is used without the water-reservoir, its upper part is then completed by a suitable cap or cover-plate, which serves as a substitute for the contracted recessed flue in the reservoir.

What I claim as my invention, and desire to secure by Letters Patent, is—

1. In a three-flued and water-reservoir cooking-stove, the arrangement of the expanded and contracted parts F and E, forming the rising-flue thereof, together, as shown, and in rear of the diving-flues H and H′, so as to overlap the same, substantially as described.

2. In a three-flued and water-reservoir cooking-stove, the combination of the expanded lower part F and the contracted upper part E of the rising-flue thereof, with each other and with the diving-flues H and H′, arranged substantially as described.

3. In a three-flued cooking-stove, the aforesaid expanded and contracted rising-flue E F thereof, arranged in rear of and overlapping the diving-flues H and H′, substantially as described.

4. The extension G of the oven of a three-flued cooking-stove to the flue-division plate A, and between the diving-flues H and H′ thereof, substantially as described.

5. Separating the rising exit-flue of a three-flued cooking-stove from the diving-flues H and H′ and extended oven G thereof, by means of the flue-division plate A, arranged transversely from side to side of the stove, and in rear of said diving-flues, substantially as described.

6. The construction of the water-reservoir or tank D of a cooking-stove, at its side where adjoining the end of the stove, with a recessed contracted flue, E, therein, substantially as and for the purpose described.

7. The combination, with each other, of the water-reservoir D, its recessed contracted rising-flue part E, the expanded rising-flue part F, the diving-flues H and H′, and the damper *a*, all constructed and relatively arranged, substantially as and for the purpose described.

8. The construction of the rising exit-flue of a three-flued cooking-stove, by means of the division-flue plate A, flue-plate F, and water-reservoir D, when said flue is arranged in rear of the diving-flues H and H′ thereof, substantially as hereinbefore set forth, so that the escaping heat or gases of combustion shall pass upward between the said water-reservoir, the plate A, plate F, and in rear of the said diving-flues, in manner substantially as described.

ROBT. SCORER.

Witnesses:
JOHN J. SAVAGE,
J. S. BARNEY.